US008873532B2

(12) United States Patent
Kwon et al.

(10) Patent No.: US 8,873,532 B2
(45) Date of Patent: Oct. 28, 2014

(54) APPARATUS AND METHOD FOR TRANSMITTING DATA IN WIRELESS COMMUNICATION SYSTEM

(75) Inventors: Ho-Joong Kwon, Seoul (KR); Han-Byul Seo, Seoul (KR); Seon-Wook Kim, Seoul (KR); Byeong-Gi Lee, Seoul (KR); Jong-Hyung Kwun, Seongnam-si (KR); Ok-Seon Lee, Suwon-si (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1082 days.

(21) Appl. No.: 12/322,132

(22) Filed: Jan. 29, 2009

(65) Prior Publication Data

US 2009/0196273 A1    Aug. 6, 2009

(30) Foreign Application Priority Data

Feb. 1, 2008    (KR) .......................... 10-2008-0010585

(51) Int. Cl.
*H04J 1/00*     (2006.01)
*H04W 4/00*   (2009.01)
*H04W 8/30*   (2009.01)

(52) U.S. Cl.
CPC ........................................ *H04W 8/30* (2013.01)
USPC .......................................... 370/343; 370/338

(58) Field of Classification Search
CPC ...................................................... H04W 8/30
USPC .................................................. 370/338, 343
See application file for complete search history.

(56) References Cited

U.S. PATENT DOCUMENTS

| 2004/0095911 A1* | 5/2004 | Benveniste et al. ........... 370/338 |
| 2005/0135284 A1* | 6/2005 | Nanda et al. .................. 370/294 |
| 2006/0050742 A1 | 3/2006 | Grandhi et al. |
| 2007/0165521 A1* | 7/2007 | Malik et al. ................... 370/229 |
| 2009/0086706 A1* | 4/2009 | Huang et al. .................. 370/349 |

FOREIGN PATENT DOCUMENTS

KR    10-2006-0050458    5/2006

OTHER PUBLICATIONS

Notice of Preliminary Rejection dated Dec. 5, 2013 in connection with Korean Patent application No. 10-2008-0010585; 8 pages.
Notice of Patent Grant dated Jul. 14, 2014 in connection with Korean Patent Application No. 10-2008-0010585; 7 pages.

* cited by examiner

*Primary Examiner* — Noel Beharry
*Assistant Examiner* — Farhad Ali

(57) ABSTRACT

An apparatus and a method for a random access scheme for multi-channel in a wireless communication system are provided. The method for performing the random access scheme for the multi-channel in the wireless communication system includes randomly generating a backoff counter value to transmit data; adjusting the backoff counter value by taking into account status of a plurality of idle subcarrier sets per backoff slot; when the backoff counter value becomes zero, selecting one or more subcarrier sets to carry the data from the idle subcarrier sets; and transmitting the data through the selected one or more subcarrier sets. The data collision probability between the terminals can be lowered, the channel utility can be enhanced, the transfer rate in the single-channel random access scheme can be raised, and the consumption of the radio resource can be reduced without using signals for the band request and allocation.

20 Claims, 9 Drawing Sheets

| UPLINK INTERVAL LENGTH | BANDWIDTH OF #QoS CLASS 1 | NUMBER OF MAUS OF #QoS CLASS 1 | BANDWIDTH OF #QoS CLASS 2 | NUMBER OF MAUS OF #QoS CLASS 2 | ..... |
|---|---|---|---|---|---|
| 600 | 610 | 620 | 630 | 640 | |

FIG.6

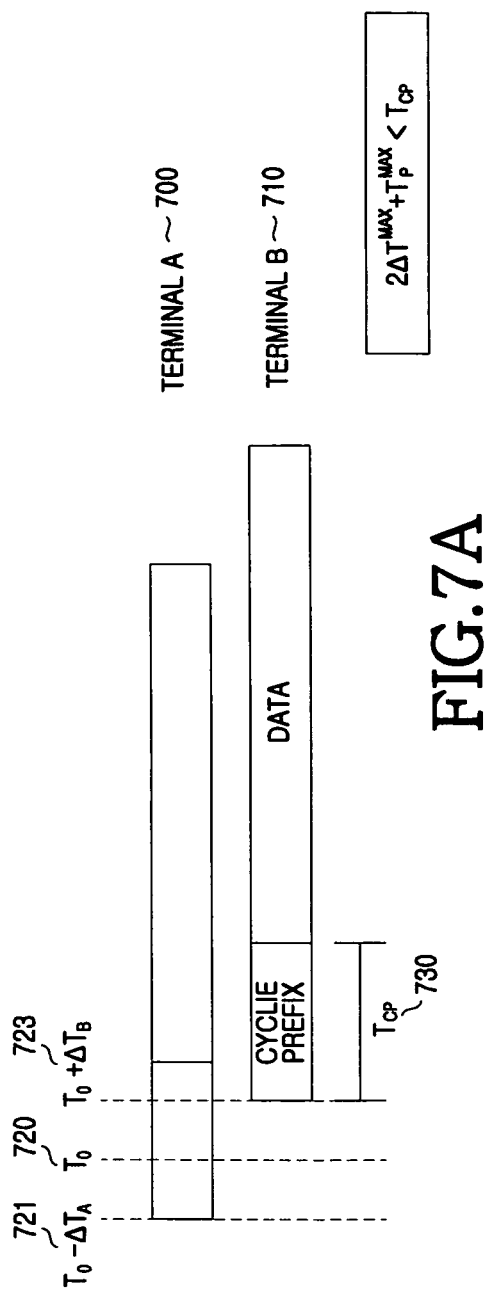
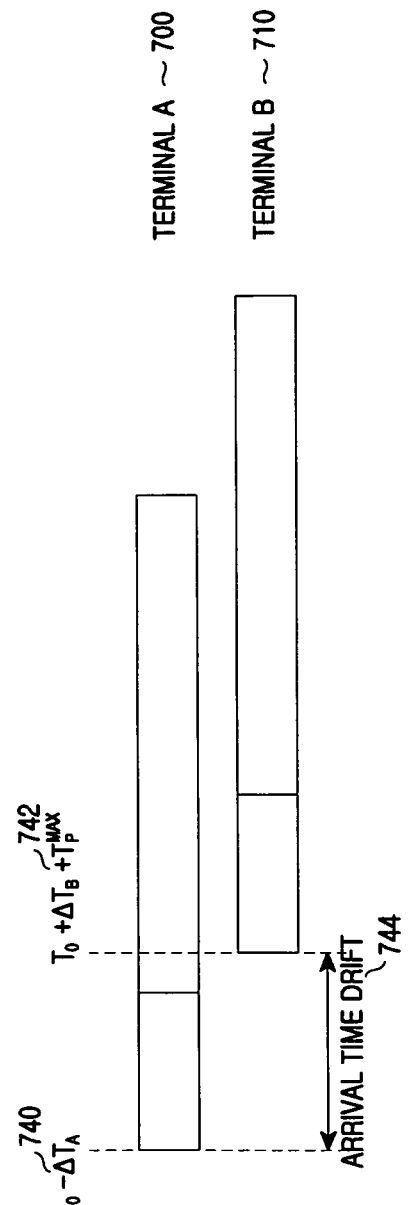
FIG.7A
FIG.7B

APPARATUS AND METHOD FOR TRANSMITTING DATA IN WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 1, 2008 and assigned Serial No. 10-2008-0010585, the entire disclosure of which is hereby incorporated by reference.

TECHNICAL FIELD OF THE INVENTION

The present invention relates generally to an apparatus and a method for transmitting data in a wireless communication system. More particularly, the present invention relates to an apparatus and a method for transmitting data using a random multiple access based on a multi-channel in the wireless communication system.

BACKGROUND OF THE INVENTION

A wireless communication system based on an Orthogonal Frequency Division Multiplexing (OFDM) can be applied to different multiple access schemes in a frequency domain and a time domain.

In the frequency domain, the wireless communication system can use the OFDM scheme in which one terminal exclusively occupies the entire frequency band in a particular time, and an Orthogonal Frequency division Multiple Access (OFDMA) scheme in which a plurality of terminals occupies different subchannels (or OFDM subchannels) in the same time.

In the time domain, the wireless communication system can use a scheduled access scheme in which a centralized scheduler manages the resource allocation of the terminals, and a random access scheme in which the terminals occupy the resources in competition.

The OFDM wireless communication system can constitute different combinations of four multiple access schemes. For example, the wireless communication system can transmit data in the first combination of the OFDM scheme and the scheduled access scheme, in the second combination of the OFDM scheme and the random access scheme, in the third combination of the OFDMA scheme and the scheduled access scheme, and in the fourth combination of the OFDMA scheme and the random access scheme. The first, second, and third combinations are adopted to Institute of Electrical and Electronics Engineers (IEEE) 802.11 and 802.16 standards.

When the wireless communication system employs the second combination, a single terminal exclusively possesses the entire frequency band in a specific time according to the OFDM scheme. Accordingly, the wireless communication system uses the random access scheme by which the terminals competitively occupy the time resource.

However, in the OFDMA scheme, the plurality of the terminals utilizes different subchannels in the same time resource. Correspondingly, in the fourth combination, the wireless communication system needs to adopt the random access scheme such that the terminals competitively occupy the resource in the two dimensional space of the time resource and the frequency resource.

Thus, what is needed is a multi-channel based random access scheme in order to transmit data using the OFDMA scheme and the random access scheme in the wireless communication system.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for transmitting data using a multi-channel based random access scheme in a wireless communication system.

Another aspect of the present invention is to provide an apparatus and a method for transmitting data using a Carrier Sense Multiple Access with Collision Avoidance (CSMA/CA) algorithm in an Orthogonal Frequency Division Multiple Access (OFDMA) wireless communication system.

Yet another aspect of the present invention is to provide an apparatus and a method for constituting a frame for a CSMA/CA algorithm in an OFDMA wireless communication system.

According to one aspect of the present invention, a method for performing a random access scheme for a multi-channel in a wireless communication system includes randomly generating a backoff counter value to transmit data; adjusting the backoff counter value by taking into account status of a plurality of idle subcarrier sets per backoff slot; when the backoff counter value becomes zero, selecting one or more subcarrier sets to carry the data from the idle subcarrier sets; and transmitting the data through the selected one or more subcarrier sets.

According to another aspect of the present invention, an apparatus for performing a random access scheme for a multi-channel in a wireless communication system includes a backoff time generator for randomly generating a backoff counter value to transmit data; a backoff counter controller for adjusting the backoff counter value by taking into account status of a plurality of idle subcarrier sets per backoff slot; and a controller for, when the backoff counter value becomes zero, selecting one or more subcarrier sets to carry the data from the idle subcarrier sets and transmitting the data through the selected one or more subcarrier sets.

According to yet another aspect of the present invention, a method for constituting a frame in a wireless communication system includes constituting a control message which comprises constitution information of the frame in a first interval of the frame; constituting an uplink region for one or more nodes to send uplink signals according to a random access scheme based on multi-channel in a second interval of the frame; constituting an ACK channel in relation to the uplink signals transmitted by the nodes in a third interval of the frame; constituting a downlink region for a base station to send a downlink signal in a fourth interval of the frame; and constituting a communication region of a compatible communication system in a fifth interval of the frame.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a beacon message for the multi-channel carrier sense multiple access with collision avoidance in the wireless communication system according to an exemplary embodiment of the present invention;

FIGS. 7A and 7B illustrate a synchronization error between terminals in the multi-channel carrier sense multiple access with collision avoidance of the wireless communication system according to an exemplary embodiment of the present invention;

Throughout the drawings, like reference numerals will be understood to refer to like parts, components and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

Exemplary embodiments of the present invention provide a technique for transmitting data using a random access scheme in an OFDMA wireless communication system.

It is assumed that the wireless communication system performs CSMA/CA according to the random access scheme.

In what follows, the wireless communication system divides the whole frequency band into M-ary Multiple Access Units (MAUs) for the CSMA/CA algorithm based on the multiple channels. Herein, one MAU includes a plurality of OFDM subcarriers. The MAU is a competition unit between terminals in a frequency domain. For the data transmission, the terminal can select and use one or more MAUs at a time. The terminal can transmit one data packet through the multiple MAUs or transmit data packets through one MAU.

Figure 1:
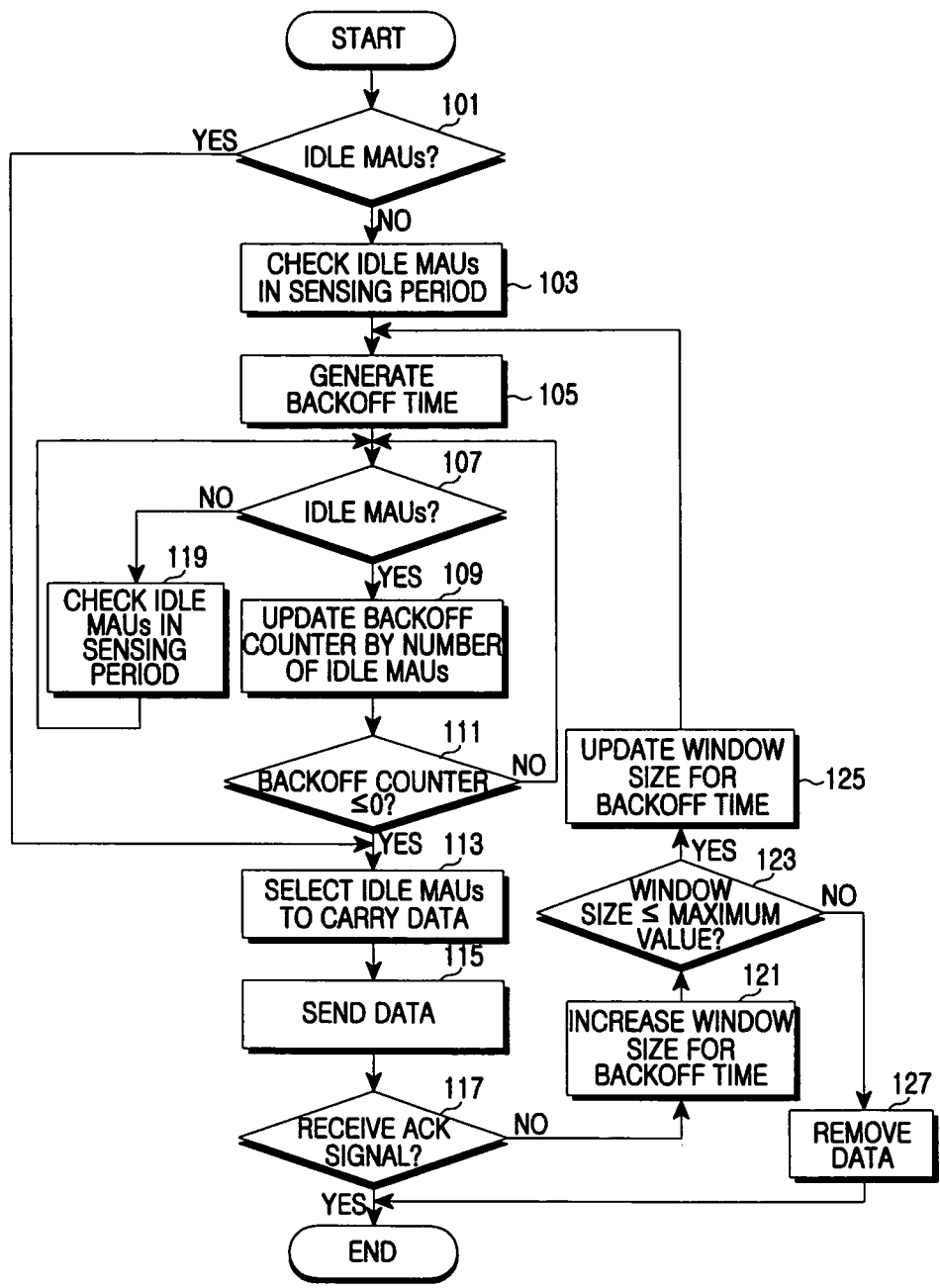
FIG. 1 illustrates a carrier sense multiple access with collision avoidance method for multiple channels in a wireless communication system according to an exemplary embodiment of the present invention.
Figure 2:
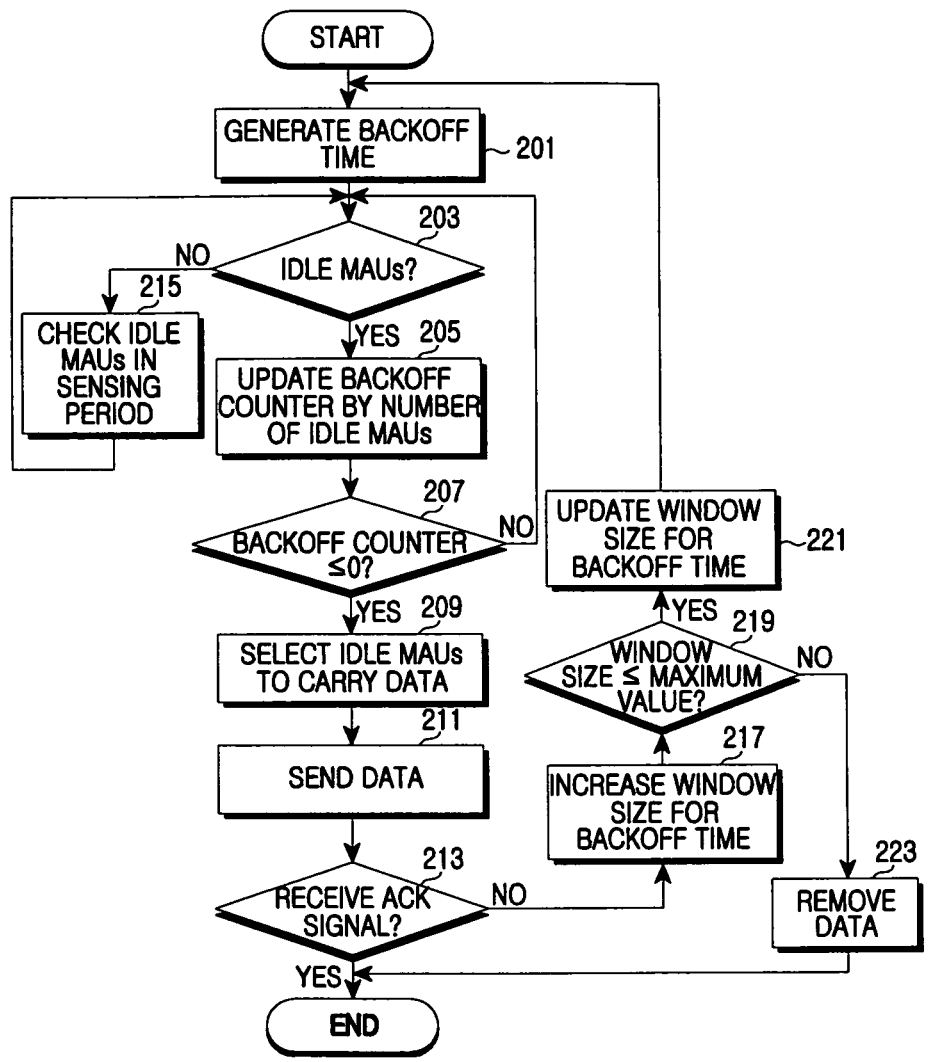
FIG. 2 illustrates a carrier sense multiple access with collision avoidance method for multiple channels in a wireless communication system according to another exemplary embodiment of the present invention.

For the CSMA/CA based on the OFDMA, the terminals of the wireless communication system operate as shown in FIG. 1 or FIG. 2. Herein, the terminal represents a node which occupies resource according to the random access scheme.

In the initial data transmission, the terminals operate as shown in FIG. 1.

FIG. 1 illustrates the CSMA/CA method for the multiple channels in the wireless communication system according to an exemplary embodiment of the present invention.

In step 101, the terminal checks for idle MAUs to transmit data. The terminal can check whether MAU channels are usable or not by processing the Fourier transform on OFDM symbols of a signal received over radio resources. The idle MAU indicates that the MAU is not being used by other terminals.

When detecting the idle MAUs, the terminal selects at least one MAU from the idle MAUs to transmit data in step 113.

When not detecting idle MAUs in step 101, the terminal checks for idle MAUs in a sensing period in step 103.

When detecting the idle MAUs in the sensing period, the terminal generates a random backoff time in consideration of a Contention Window (CW) size for the backoff time in step 105. When the sensing period ends in the middle of the backoff slot, the terminal delays the backoff time generation until the start point of the next backoff slot. The window size for the backoff time is set to a minimum value in the initial data transmission.

Next, the terminal checks for idle MAUs in the backoff slot in step 107. Boundaries of the backoff slots of different MAUs are in contact with each other. The terminal can generate the backoff time or transmit data only at the start point of the backoff slot.

When not detecting idle MAUs in the backoff slot, the terminal checks for idle MAUs in the sensing period in step 119.

When detecting the idle MAUs in the sensing period, the terminal goes back to step 105 and checks for idle MAUs in the backoff slot. Further, when detecting the idle MAUs in the sensing period, the terminal examines whether the idle MAUs stay in the idle mode during the sensing period.

When detecting idle MAUs in the backoff slot in step 107, the terminal updates a backoff counter value (or the number of backoff slots in the backoff time) set by the generated backoff time, using the number of the idle MAUs in step 109. For example, the terminal decreases the backoff counter value set in the backoff time by the number of the idle MAUs (that is, the terminal subtracts the number of the detected idle MAUs from the backoff counter value). The backoff time equals the product of the backoff counter value and the size of backoff slot.

In step 111, the terminal checks whether it is the data transmission time based on the updated backoff counter value. When the updated backoff counter value is less than or equal to zero, it is the data transmission time.

When the backoff counter value is greater than zero, the terminal returns to step 107 and checks for idle MAUs in the next backoff slot.

When the backoff counter value is less than or equal to zero, the terminal randomly selects at least one MAU from the idle MAUs to transmit data in step 113.

In step 115, the terminal transmits data through the selected MAUs.

Next, the terminal checks whether an ACKnowledge (ACK) signal is received from a node receiving the data in step 117.

When receiving the ACK signal from the intended node, the terminal finishes this process.

Meanwhile, when the ACK signal is not received from the intended node over a certain time or when a Negative ACK (NACK) signal is received in step 117, the terminal increases the window size for the backoff time in step 121. For example, the terminal determines the window size using a binary exponential backoff algorithm. Namely, the terminal doubles the window size.

In step 123, the terminal compares the increased window size with a maximum value of the window size to check whether the increased window size is usable or not.

When the increased window size is smaller than or equal to the maximum value (window size≤maximum value), the terminal updates the window size used for the backoff time in step 103, with the increased window size in step 125.

Next, the terminal goes back to step 105 and generates the backoff time based on the updated window size.

When the increased window size is greater than the maximum value (window size>maximum value) in step 123, the terminal removes the corresponding data transmission in step 127. Next, the terminal finishes this process.

When the terminals transmit other data after the initial data transmission, the terminals operate as shown in FIG. 2.

FIG. 2 illustrates a CSMA/CA method for the multiple channels in the wireless communication system according to another exemplary embodiment of the present invention.

To transmit data, the terminal generates a random backoff time by taking into account the window size for the backoff time in step 201. When the sensing period for checking for the idle MAUs ends in the middle of the backoff slot, the terminal delays the backoff time generation until the start point of the next backoff slot. The window for the backoff time is set to a minimum value in the initial data transmission.

In step 203, the terminal checks whether there are idle MAUs in the backoff slot. Boundaries of the backoff slots of different MAUs are in contact with each other. The terminal can generate the backoff time or transmit data only at the start point of the backoff slot.

When not detecting idle MAUs in the backoff slot, the terminal checks for idle MAUs in the sensing period in step 215.

When not detecting idle MAUs in the sensing period, the terminal continuously checks for idle MAUs.

When detecting idle MAUs in the backoff slot in step 203, the terminal updates a backoff counter value set by the generated backoff time with the number of the idle MAUs in step 205. For example, the terminal subtracts the number of the detected idle MAUs from the backoff counter value. The backoff time equals the product of the backoff counter value and the size of backoff slot.

In step 207, the terminal checks whether it is the data transmission time based on the updated backoff counter value. When the updated backoff counter value is less than or equal to zero, it is the data transmission time.

When the backoff counter value is greater than zero, the terminal returns to step 203 and checks for idle MAUs in the next backoff slot.

When the backoff counter value is less than or equal to zero, the terminal randomly selects at least one MAU from the idle MAUs to transmit data in step 209.

In step 211, the terminal transmits data through the selected MAUs.

Next, the terminal checks whether an ACK signal is received from a node receiving the data in step 213.

When receiving the ACK signal from the intended node, the terminal finishes this process.

Meanwhile, when the ACK signal is not received from the intended node over a certain time or when a NACK signal is received in step 213, the terminal increases the window size for the backoff time in step 217. For example, the terminal determines the window size using the binary exponential backoff algorithm. Namely, to increase the window size, the terminal doubles the window size.

In step 219, the terminal compares the increased window size with the maximum value of the window size to check whether the increased window size is usable or not.

When the increased window size is smaller than or equal to the maximum value (window size≤maximum value), the terminal updates the window size used for the backoff time in step 201, with the increased window size in step 221.

When the increased window size is greater than the maximum value (window size>maximum value) in step 219, the terminal removes the corresponding data transmission in step 223. Next, the terminal finishes this process.

When the wireless communication system conducts the CSMA/CA based on the OFDMA as stated above, the terminals determine their data transmission time by updating the backoff counter value based on the number of the idle MAUs per backoff slot. For example, when the number of the MAUs is two (2) and three (3) terminals perform the OFDMA based CSMA/CA, the terminals carry out the OFDMA based CSMA/CA as shown in FIG. 3.

Figure 3:
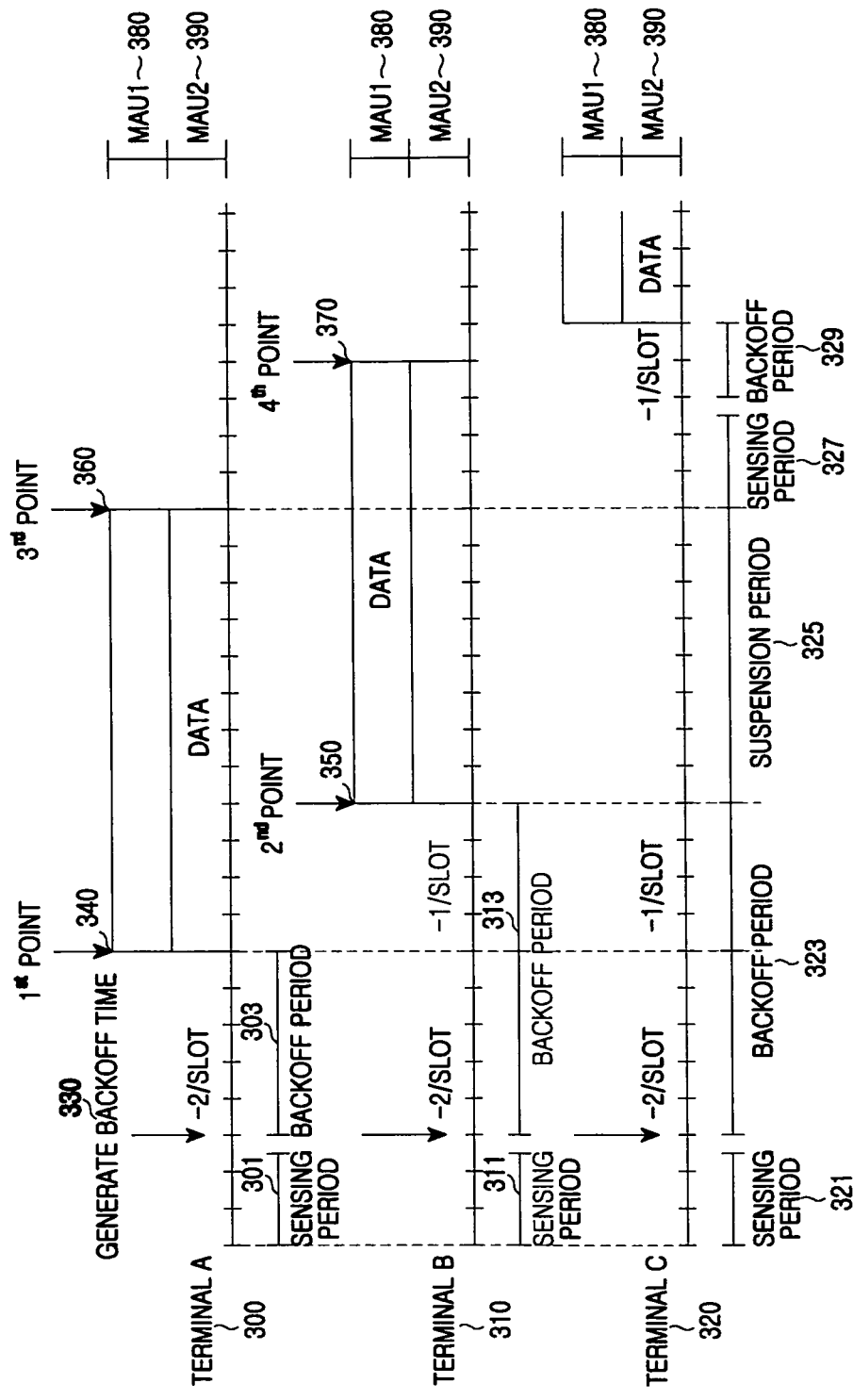
FIG. 3 illustrates a carrier sense multiple access with collision avoidance structure for the multiple channels in the wireless communication system according to an exemplary embodiment of the present invention.

FIG. 3 depicts a CSMA/CA structure for the multiple channels in the wireless communication system according to an exemplary embodiment of the present invention.

At the initial data transmission, terminals 300, 310 and 320 check for idle MAUs in the sensing period. When MAU1 380 and MAU2 390 are idle, the terminals 300, 310 and 320 generate the random backoff time (or the backoff counter) in step 330. When the sensing periods 301, 311 and 321 are present within the backoff time, the terminals 300, 310 and 320 stop the backoff time in the sensing periods 301, 311 and 321. When the sensing periods 301, 311 and 321 end, the terminals 300, 310 and 320 activate the stopped backoff time. Herein, it is assumed that the backoff counter value of the terminal A 300 according to the generated backoff time is ten (10), the backoff counter value of the terminal B 310 is fourteen (14), and the backoff counter value of the terminal C 320 is sixteen (16).

Provided that the MAU1 380 and the MAU2 390 are idle, the terminals 300, 310 and 320 decreases the backoff counter by two in every slot starting from the backoff slot of the point 330 where the backoff time is generated.

The terminal A 300 decreases the backoff counter value by two. When the backoff counter value becomes zero at the first point 340, the terminal A 300 selects at least one of the MAUs 380 and 390 and transmits data using the selected MAU. In doing so, the terminal A 300 is assumed to transmit the data by occupying the MAU1 380 up to the third point 360.

Likewise, the terminal B 310 decreases the backoff counter by two (2) in every slot until the first point 340. Since the terminal A 300 occupies the MAU1 380 at the first point 340, the number of the idle MAUs is one (1). Correspondingly, the terminal B 310 decreases the backoff counter value by one per slot starting from the first point 340. When the backoff counter value becomes zero (0) at the second point 350, the terminal B 310 transmits data through the MAU2 390. In so doing, the terminal B 310 is assumed to transmit the data by occupying the MAU2 390 until the fourth point 370.

The terminal C 320 decreases the backoff counter by two (2) in every slot until the first point 340. Since the terminal A 300 occupies the MAU1 380 at the first point 340, the terminal C 320 decreases the backoff counter value by one (1) per slot starting from the first point 340. Since the terminal B 310 occupies the MAU2 390 at the second point 350, the terminal C 320 suspends the updating of the backoff counter from the second point 350 in step 325.

When the terminal A 300 finishes its data transmission at the third point 360, the terminal C 320 checks for the idle MAUs in the sensing period 327. When the MAU1 380 is idle, the terminal C 320 decreases the backoff counter value by one (1) per slot. When the backoff counter value reaches zero (0) at the fourth point 370, the terminal C 320 transmits data through the MAU1 380. Now that the sensing period 327 lies within the backoff slot, the terminal C 320 delays the backoff counter updating until the start point of the next backoff slot (i.e., suspension period 325).

In this embodiment of the present invention, the wireless communication system carries out the CSMA/CA based on the OFDMA by dividing the whole frequency band into the MAUs.

If there are various Quality of Service (QoS) classes in the wireless communication system, the wireless communication system can separate accessible channels per QoS. In this case, the wireless communication system can perform the OFDMA based CSMA/CA per channel allocated to the QoS class.

Figure 4:
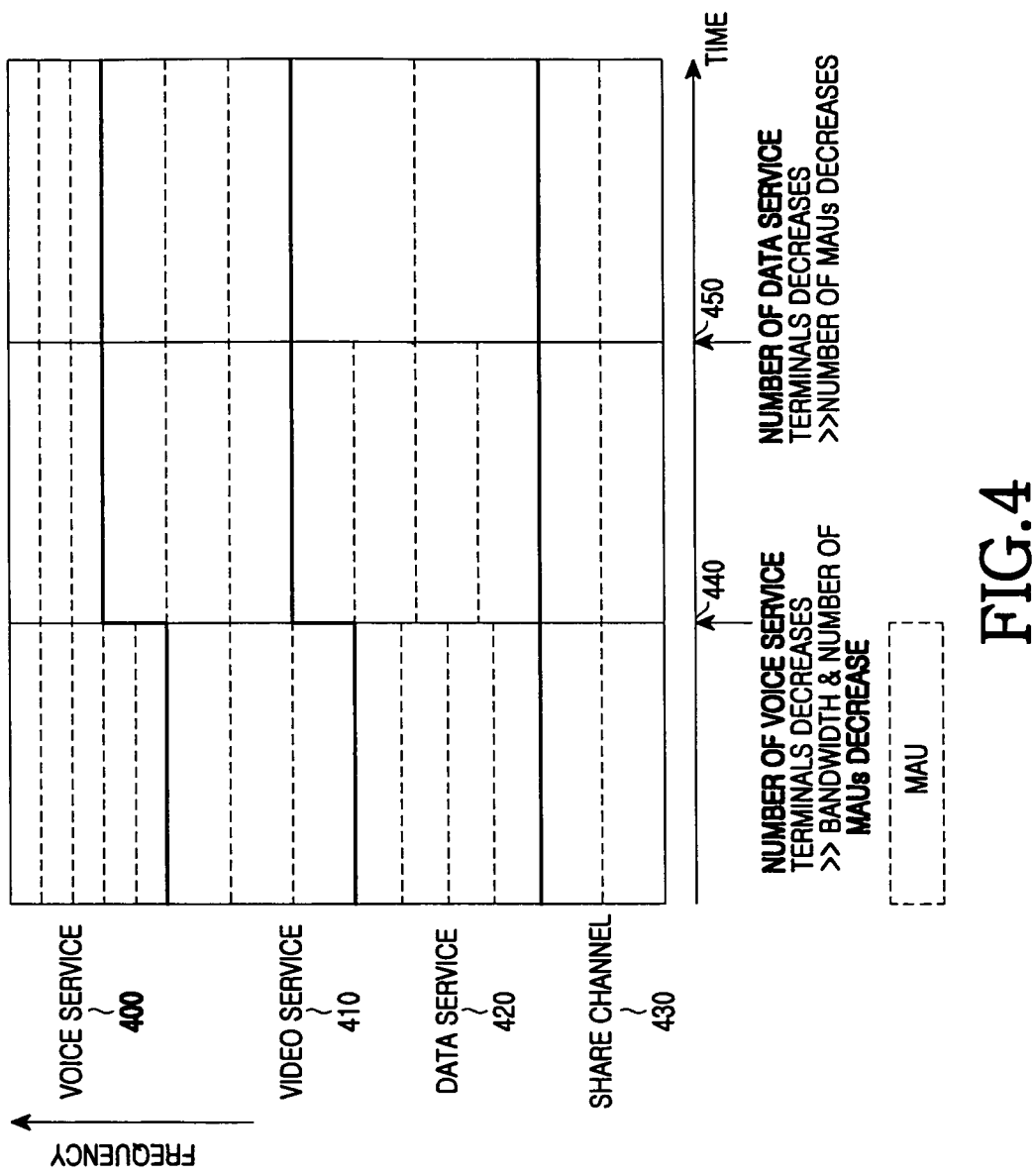
FIG. 4 illustrates a channel structure for the multi-channel carrier sense multiple access with collision avoidance in the wireless communication system according to an exemplary embodiment of the present invention.

When the wireless communication system performs the OFDMA based CSMA/CS per QoS class, the wireless communication system can divide the MAUs per QoS class as shown in FIG. 4. The data rate is maximized when the wireless communication system lets the number of the MAUs per QoS class equal the number of active terminals.

In this situation, the number of the MAUs per QoS class and one (1) MAU bandwidth may vary on the QoS class basis in the wireless communication system. The wireless communication system may vary the window size to generate Inter Frame Spacing (IFS) or the backoff time per QoS class.

FIG. 4 depicts a channel structure for the multi-channel CSMA/CA in the wireless communication system according to an exemplary embodiment of the present invention. The wireless communication system distinguishes voice service, video service, and data service based on the QoS class. The QoS class priority of the voice service is highest and the QoS class priority of the data service is lowest.

In FIG. 4, the wireless communication system allocates the frequency bands on the QoS class basis. Based on the priority of the QoS class, the wireless communication system allocates the frequency bands in the descending order of the QoS class priority.

After allocating the frequency resources for the voice service 400, the wireless communication system allocates some of the remaining frequency resources to the video service 410. Next, the wireless communication system allocates the remaining frequency resources to the data service 420. With respect to the voice service 400, the video service 410, and the data service 420, the wireless communication system can vary the number of the MAUs, one (1) MAU bandwidth, and the window size for generating the IFS or the backoff time.

When traffic load increases for every QoS class, the wireless communication system sets to use a share channel 430. The QoS class of the high priority can access and utilize the channel allocated to the QoS class of the low priority.

When the number of voice service terminals decreases in the case 440, the bandwidth required for the voice service also decreases. Hence, the wireless communication system reduces the band allocated to the voice service 400 and additionally assigns the remaining band to the data service 420. In so doing, since the number of the voice service terminals decreases, the wireless communication system decreases the number of the MAUs in the voice service 400.

When the number of the data services decreases but the bandwidth required for the data services does not decrease in the case 450, the wireless communication system reduces the number of the MAUs of the data service 430. Accordingly, the bandwidth allocated per MAU of the data service 430 increases.

Figure 5:
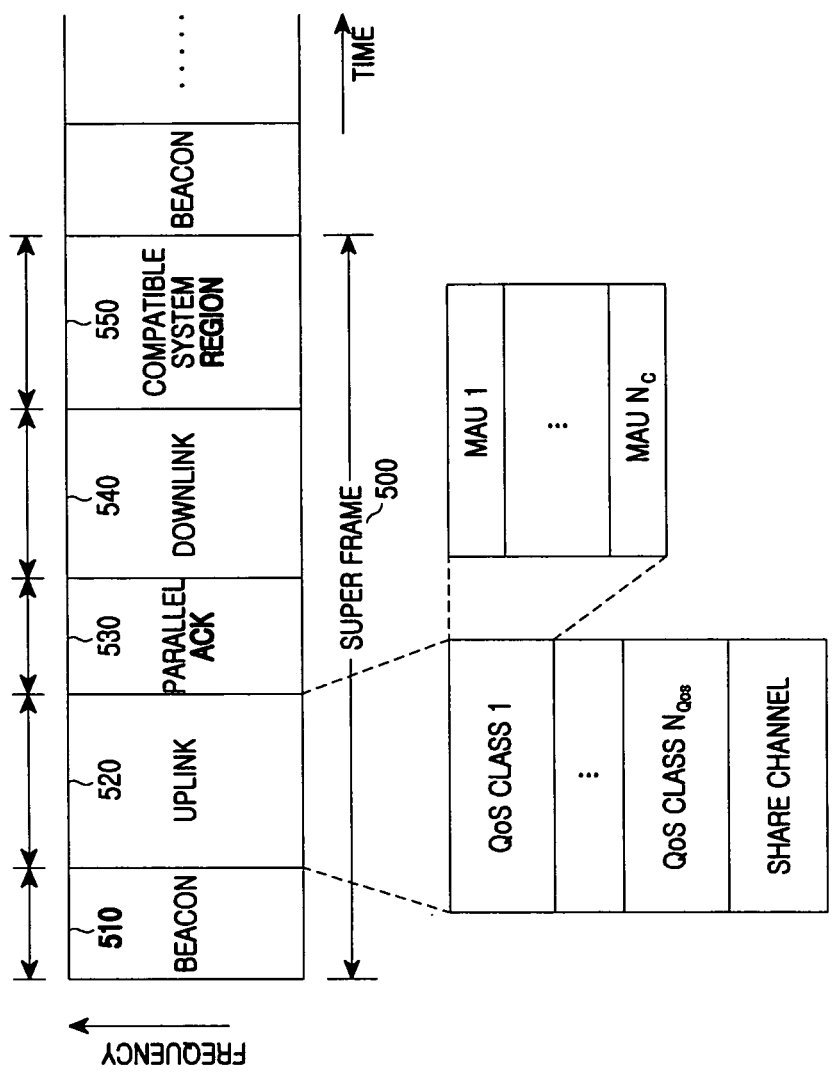
FIG. 5 illustrates a frame structure for the multi-channel carrier sense multiple access with collision avoidance in the wireless communication system according to an exemplary embodiment of the present invention.

As stated above, using the OFDMA based CSMA/CA, the channel of a Media Access Control (MAC) layer of the wireless communication system is constructed as shown in FIG. 5.

FIG. 5 illustrates a frame structure for the multi-channel CSMA/CA in the wireless communication system according to an exemplary embodiment of the present invention.

The wireless communication system supporting the OFDMA based CSMA/CA constitutes a super frame 500 in the MAC layer as shown in FIG. 5. The wireless communication system (e.g., a base station or an Access Point (AP)) periodically transmits a beacon message. The wireless communication system defines the interval between adjacent beacon messages as a super frame 500.

The super frame 500 includes a beacon message duration 510, an uplink duration 520, a parallel ACK duration 530, a downlink duration 540, and a compatible system region 550.

In the beacon message duration 510, the wireless communication system constructs and transmits a beacon message including channel structure information of the super frame 500.

In the uplink duration 520, the terminals send data to the base station using the OFDMA based CSMA/CA. When the wireless communication system divides the entire frequency band on the QoS class basis, the uplink interval 520 is divided and constituted per QoS class. $N_{QoS}$ denotes the number of the QoS classes and NC denotes the number of the MAUs in the corresponding QoS class.

In the parallel ACK duration 530, the base station sends ACK signal or NACK signal to the terminals in response to the data received from the terminals. The base station sends the ACK signal or the NACK signal to the terminals in parallel over the ACK channel interval 530.

In the downlink duration 540, the base station transmits data to the terminals.

To guarantee the compatibility with other communication systems separately from the OFDMA based CSMA/CA communication system, the wireless communication system defines the compatible system region 550. For example, when the wireless communication system guarantees the compatibility with the IEEE 802.11 system, the compatible system region 550 is allocated to the IEEE 802.11 system. When the wireless communication system guarantees the compatibility with the IEEE 802.16 system, the compatible system region 550 is allocated to the IEEE 802.16 system. That is, the frame as defined in the IEEE 802.16 standard can be constituted in the compatible system region 550.

As above, the wireless communication system constructs the channel of the MAC layer for supporting the OFDMA based CSMA/CA as the super frame. When the uplink duration 520 is independently constructed per QoS class, the wireless communication system adaptively builds the channel structure of the uplink duration 520 according to the traffic amount per QoS class.

The wireless communication system transmits the determined channel structure of the uplink duration 520 to the terminals using the beacon message. For doing so, the beacon message can be constituted as shown in FIG. 6.

FIG. 6 depicts the beacon message for the multi-channel CSMA/CA in the wireless communication system according to an exemplary embodiment of the present invention.

The beacon message of FIG. 6 includes an uplink interval length region 600, QoS class bandwidth regions 610 and 630, and QoS class MAU number regions 620 and 640.

The uplink interval length region 600 includes length information of the uplink duration 520 of the super frame 500 of FIG. 5.

The QoS class bandwidth region 610 includes bandwidth information as allocated per QoS class.

The QoS class MAU number region 620 indicates the number of MAUs in the bandwidth allocated per QoS class.

When the OFDMA wireless communication system performs the CSMA/CA as above, it is important to sustain the synchronization of the terminals which send data based on the CSMA/CA. In other words, as the plurality of the terminals transmits data at the same time, the clock drift and the radio channel propagation of the terminals differ from each other. Thus, time difference is generated when the data sent from the terminals arrive at the base station. The base station adjusts the clock drift of the terminals by periodically transmitting the beacon message including reference time information for the sake of the time synchronization. Still, after the terminal receives the beacon message, there occurs a time drift until the next beacon message is received.

Given the maximum time drift of a terminal A 700 and a terminal B 710 as shown in FIG. 7A and FIG. 7B, the time drift is maximized when data simultaneously transmitted from the terminals 700 and 710 arrive at the base station.

FIG. 7A and FIG. 7B depict a synchronization error between terminals in the multi-channel CSMA/CA of the wireless communication system according to an exemplary embodiment of the present invention.

FIG. 7A shows the time drift of the terminals 700 and 710 and FIG. 7B shows the time drift when the data simultaneously transmitted from the terminals 700 and 710 arrive at the base station.

In FIG. 7A, terminal A 700 is close to the base station and has the fast clock 721 by $\Delta T^{max}$ and terminal B is most remote from the base station and has the slow clock 723 by $\Delta T^{max}$. Herein, $\Delta T^{max}$ indicates the maximum time drift between terminals.

Given the maximum time drift of terminal A 700 and terminal B 710 as shown in FIG. 7A, the time drift 744 by which the data simultaneously transmitted from terminals 700 and 710 arrive at the base station is maximized as shown in FIG. 7B.

When the data simultaneously transmitted by terminals 700 and 710 arrive at the base station at different time points in the wireless communication, the arrival time drift 744 of the data should be less than a Cyclic Prefix (CP) so as to sustain the orthogonality between the OFDM subcarriers. That is, the wireless communication system needs to keep the terminals synchronized to meet Equation 1:

$$2\Delta T^{max} + T_p^{max} < T_{cp}.$$  [Eqn. 1]

In Equation 1, $\Delta T^{max}$ denotes the maximum value of the time drift of the terminals, $T_p^{max}$ denotes a maximum value of the radio channel delay, and $T_{cp}$ denotes the size of the CP region.

In the CSMA/CA based on the OFDMA, the wireless communication system has to keep the terminals synchronized to make the time difference of the data, which are simultaneously transmitted by the terminals, arriving at the base station, less than the CP region as expressed in Equation 1.

Now, the terminal structure for the OFDMA based CSMA/CA in the wireless communication system is explained.

Figure 8:
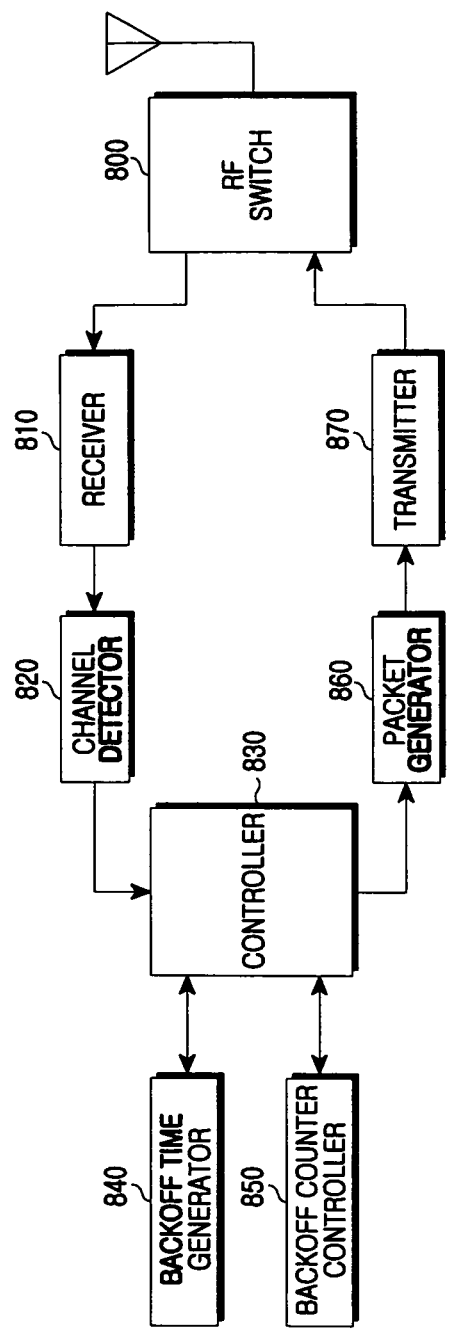
FIG. 8 illustrates a structure for a multi-channel carrier sense multiple access with collision avoidance algorithm in the wireless communication system according to an exemplary embodiment of the present invention.

FIG. 8 is a block diagram of the structure for the multi-channel CSMA/CA algorithm in the wireless communication system according to an exemplary embodiment of the present invention. Hereafter, while the wireless communication system is assumed to adopt a Time Division Duplex (TDD) scheme, the present invention is applicable to other communication schemes.

The terminal of FIG. 8 includes a Radio Frequency (RF) switch 800, a receiver 810, a channel detector 820, a controller 830, a backoff time generator 840, a backoff counter controller 850, a packet generator 860, and a transmitter 870.

The RF switch 800 switches to connect an antenna and the receiver 810 so as to receive the signal in the reception period according to the TDD time. The RF switch 800 switches to connect the antenna and the transmitter 870 to send the signal in the transmission period according to the TDD.

The receiver 810 includes an RF processor, an OFDM demodulator, and a channel decoder. The receiver 810 restores the data from the signal fed from the switch 800 and sends the data to the channel detector 820. The RF processor converts the RF signal output from the RF switch 800 to a baseband signal. The OFDM demodulator Fourier-transforms the time-domain signal output from the RF processor to a frequency-domain signal. The OFDM demodulator can employ a Fast Fourier Transform (FFT) operator which performs the FFT. The channel decoder includes a demodulator, a deinterleaver, and a channel decoder.

The channel detector 820 determines whether the channels are active per MAU using the OFDM symbol Fourier-transformed at the receiver 810 and checks for idle MAUs.

The controller 830 controls the OFDMA based CSMA/CA protocol of the terminal. In more detail, the controller 830 checks for the presence of the idle MAUs confirmed by the channel detector 820 in the sensing period. Detecting the idle MAU, the controller 830 controls the backoff time generator 840 to generate the backoff time. In so doing, when the sensing period lies within the backoff time, the controller 830 stops the backoff time. When the sensing period ends, the controller 830 resumes the suspended backoff time.

The backoff time generator 840 generates the random backoff time in consideration of the window size to generate the backoff time under the control of the controller 830.

When the data transmitted to the base station is compromised, the backoff time generator 840 increases the window size under the control of the controller 830. For example, the backoff time generator 840 determines the window size using the binary exponential backoff algorithm. To increase the window size, the backoff time generator 840 doubles the current window size. In so doing, the backoff time generator 840 controls the increased window size not to exceed the maximum window size.

The backoff counter controller 850 determines the backoff counter value according the backoff time generated at the backoff time generator 840 under the control of the controller 800.

Also, the backoff counter controller 850 decreases the backoff counter value by the number of the idle MAUs per slot under the control of the controller 800. When the backoff counter value falls below zero (0), the backoff counter controller 850 provides the backoff counter value to the controller 830.

The controller 830 determines the MAU from the idle MAUs to carry data.

The packet generator 860 generates data packets to be transmitted through the MAU determined by the controller 830.

The transmitter 870 includes a channel coder, an OFDM modulator, and an RF modulator. The transmitter 870 modulates the data provided from the packet generator 860 to an RF signal to be sent in the MAU determined by the controller 830 and sends the RF signal to the RF switch 800. The channel coder includes a modulator, an interleaver, and a channel coder. The OFDM modulator converts the data carried by the subcarriers into the time domain through an Inverse FFT (IFFT). The OFDM modulator can employ an IFFT operator for the IFFT. The RF modulator converts the baseband signal output from the OFDM modulator to an RF signal and sends the RF signal to the RF switch 800.

As above, the OFDMA wireless communication system divides the whole frequency band to the MAUs and provides the OFDMA based CSMA/CA. In the wireless communication system, Signal to Noise Ratio (SNR) per MAU differs depending on the frequency selectivity of the radio channel.

Hence, as the backoff counter value becomes zero (0), the terminal selecting the MAUs to carry the data can select the MAU of the best SNR in the wireless communication system.

Alternatively, rather than each terminal using the single backoff counter, the terminal may use the individual backoff counter per MAU. More specifically, as the backoff time is generated, the backoff counters can be distributed based on the SNR of the MAUs and the MAUs can be selected in sequence according to their SNR. In so doing, after the backoff counters are equally distributed to the MAUs, the MAUs can be selected in sequence according the SNR by applying the decrease of the backoff counter to the MAUs.

Now, the performance change of the OFDMA based CSMA/CA in the wireless communication system is described.

Figure 9:
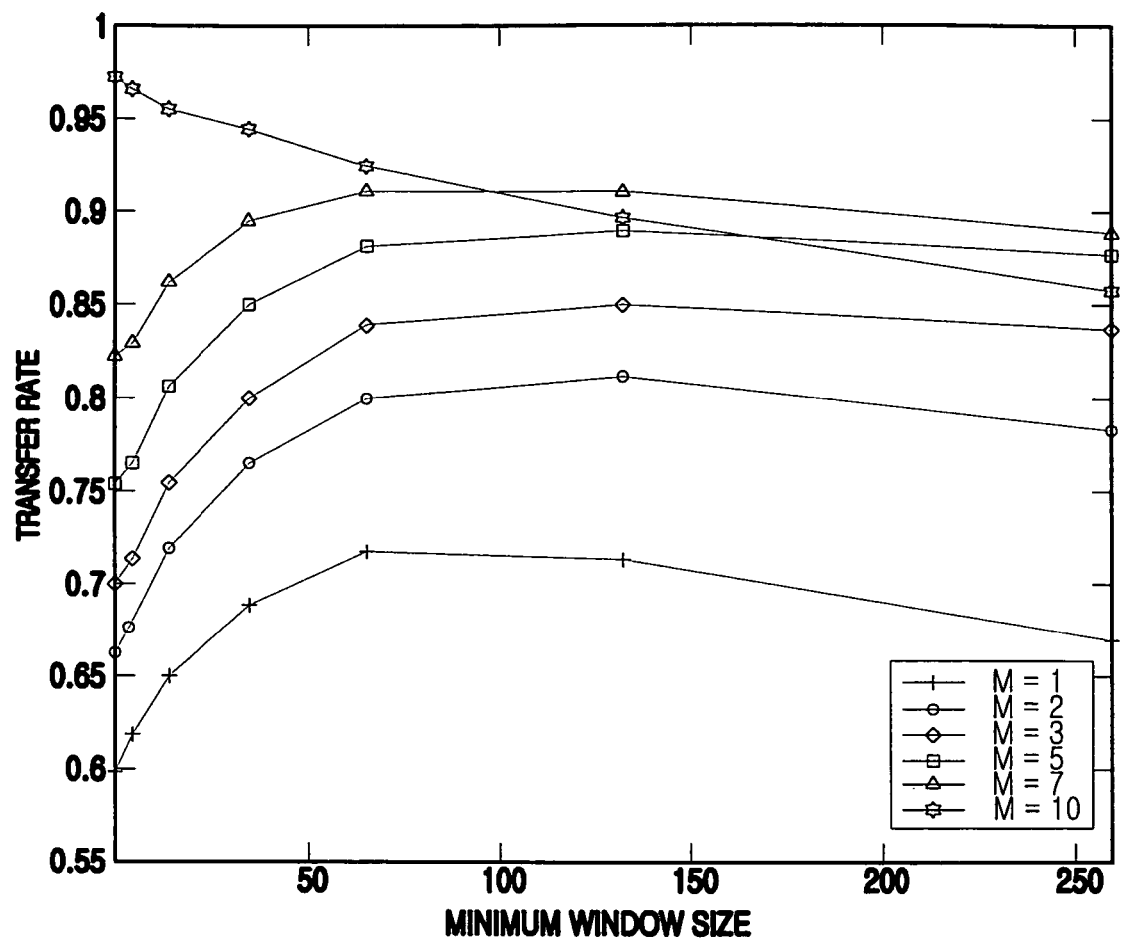
FIG. 9 illustrates a performance change in the wireless communication system according to an exemplary embodiment of the present invention.

FIG. 9 is a graph showing the performance change in the wireless communication system according to an exemplary embodiment of the present invention. The horizontal axis indicates the minimum window size for generating the backoff time and the vertical axis indicates the transfer rate. The transfer rate indicates the number of data successfully transmitted during the time required to convey one data.

Provided that the number of terminals is ten (10) and every terminal always has data to transmit in the wireless communication system, when the whole frequency band is divided to M-ary MAUs, FIG. 9 shows the transfer rate in the CSMA/CA for the M-ary multiple channels. When the M is one (1), the transfer rate is the same as in the CSMA/CA of the single channel in the wireless communication system.

As the number of the MAUs increases, the transfer rate of the CSMA/CA for the multi-channel is drastically enhanced. In particular, when the number of the terminals is equal to the number of the MAUs, the collision probability between the terminals greatly reduces. The transfer rate close to one (1) can be accomplished by decreasing the window size for generating the backoff time.

As set forth above, using the random access scheme based on the multi-channel in the OFDMA wireless communication system, the data collision probability between the terminals can be lowered, the channel utility can be enhanced, the transfer rate in the single-channel random access scheme can be raised, and the consumption of the radio resource can be reduced without using signals for the band request and allocation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing a random access scheme for a multi-channel wireless communication system, the method comprising:
   randomly generating a backoff counter value;
   determining whether any of a plurality of subcarrier sets are idle;
   after determining whether any of the plurality of subcarrier sets are idle, adjusting the backoff counter value according to a number of determined idle subcarrier sets;
   when the backoff counter value becomes zero, selecting one or more of the subcarrier sets to carry the data from the idle subcarrier sets; and
   transmitting the data through the selected one or more subcarrier sets,
   wherein adjusting the backoff counter value according to the number of determined idle subcarrier sets comprises decreasing the backoff counter value by the number of determined idle subcarrier sets.

2. The method of claim 1, further comprising:
   dividing a whole frequency band into the plurality of subcarrier sets.

3. The method of claim 1, further comprising:
   allocating a whole frequency band based on a quality of service class; and
   dividing the allocated bandwidth per quality of service class into the one or more subcarrier sets.

4. The method of claim 1, wherein the one or more subcarrier sets are selected according to at least one of at random or based on a signal to noise ratio.

5. The method of claim 1, further comprising:
   determining whether an acknowledge signal or a negative acknowledgement signal is received for the transmitted data; and
   when receiving the negative acknowledgement signal, updating a window size to generate the backoff counter value.

6. The method of claim 5, wherein the updating of the window size comprises:
   exponentially increasing the window size;
   comparing the increased window size with a maximum value of the window; and
   when the window size is smaller than or equal to the maximum value of the window, generating the backoff counter value using the increased window size.

7. The method of claim 1, further comprising decreasing the backoff counter value as the number of idle subcarrier sets increases.

8. An apparatus configured to perform a random access scheme for a multi-channel wireless communication system, the apparatus comprising:
- a backoff time generator configured to randomly generate a backoff counter value;
- a controller configured to determine whether any of a plurality of subcarrier sets are idle; and
- a backoff counter controller configured to adjust the backoff counter value according to a number of determined idle subcarrier sets, after, by the controller, determining whether any of the plurality of subcarrier sets are idle,
- wherein the controller is configured to, when the backoff counter value becomes zero, select one or more subcarrier sets to carry the data from the idle subcarrier sets and transmit the data through the selected one or more subcarrier sets, and
- wherein the backoff counter controller is configured to adjust the backoff counter value by decreasing the backoff counter value by the number of determined idle subcarrier sets.

9. The apparatus of claim 8, wherein the controller is configured to divide a whole frequency band into one or more subcarrier sets.

10. The apparatus of claim 8, wherein the controller is configured to:
- allocate a whole frequency band based on a quality of service class; and
- divide the allocated bandwidth per quality of service class into one or more subcarrier sets.

11. The apparatus of claim 8, wherein the controller is configured to select the one or more subcarrier sets at random or based on a signal to noise ratio.

12. The apparatus of claim 8, wherein the controller is configured to:
- determine whether an acknowledgement signal or a negative acknowledgement signal is received for the transmitted data; and
- when receiving the negative acknowledgement signal, update a window size to generate the backoff counter value.

13. The apparatus of claim 12, wherein the controller is configured to exponentially increase the window size to update the window size and compare the increased window size with a maximum value of the window, and
- when the window size is smaller than or equal to the maximum value of the window, the backoff time generator is configured to generate a random backoff counter value using the increased window size.

14. A method for transmitting a medium access control (MAC) frame between an access point (AP) and a plurality of stations in a wireless communication system, the method comprising:
- transmitting, from the AP to the stations, a control message which comprises structure information of the frame in a first interval of the frame;
- transmitting, from the stations to the AP, an uplink region for one or more nodes to send uplink signals according to a random access scheme based on multi-channel in a second interval of the frame;
- transmitting, from the AP to the stations, an acknowledgement/non-acknowledgement (ACK/NACK) channel in response to the uplink signals in a third interval of the frame; and
- transmitting, from the AP to the stations, a downlink signal in a fourth interval of the frame,
- wherein the control message includes a beacon message transmitted from the AP to the stations,
- wherein the frame includes the first interval, the second interval, the third interval, and the fourth interval in sequence, and
- wherein the random access scheme comprises decreasing a backoff counter value by a number of subcarrier sets that were determined to be idle.

15. The method of claim 14, wherein the control message is generated in the first interval by identifying length information of the second interval, bandwidth information of quality of service classes, and information relating to the number of subcarrier sets per quality of service class.

16. The method of claim 14, further comprising:
- dividing a whole frequency band into subcarrier sets in the second interval.

17. The method of claim 14, further comprising:
- dividing a whole frequency band into a number of subcarrier sets corresponding to the number of nodes which send data using a random access scheme for the multi-channel, in the second interval.

18. The method of claim 14, further comprising:
- dividing a whole frequency band based on a quality of service in the second interval; and
- dividing the divided frequency band into subcarrier sets based on the quality of service class.

19. The method of claim 14, further comprising:
- dividing a whole frequency band based on a quality of service in the second interval; and
- dividing the divided frequency band into a number of subcarrier sets corresponding to the number of nodes which send data using a random access scheme for the multi-channel per quality of service class.

20. The method of claim 19, further comprising:
- generating a share channel to which every quality of service class is accessible, in the second interval.

* * * * *